US010928524B2

United States Patent
Yang et al.

(10) Patent No.: US 10,928,524 B2
(45) Date of Patent: Feb. 23, 2021

(54) LANE DETECTION

(71) Applicant: Harman International Industries, Incorporated, Stamford, CT (US)

(72) Inventors: Zeng Yang, Shanghai (CN); Qingshan Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 554 days.

(21) Appl. No.: 15/525,758

(22) PCT Filed: Dec. 10, 2014

(86) PCT No.: PCT/CN2014/093468
§ 371 (c)(1),
(2) Date: May 10, 2017

(87) PCT Pub. No.: WO2016/090571
PCT Pub. Date: Jun. 16, 2016

(65) Prior Publication Data
US 2017/0322314 A1  Nov. 9, 2017

(51) Int. Cl.
*G01S 19/51* (2010.01)
*G01S 5/00* (2006.01)
(Continued)

(52) U.S. Cl.
CPC ............ *G01S 19/51* (2013.01); *G01S 5/0072* (2013.01); *G01S 5/0289* (2013.01); *G01S 19/39* (2013.01); *G01S 19/393* (2019.08)

(58) Field of Classification Search
CPC .................................. G01S 19/51; G01S 19/39
(Continued)

(56) References Cited

U.S. PATENT DOCUMENTS

2014/0358321 A1* 12/2014 Ibrahim ................. G01S 19/14
701/1

FOREIGN PATENT DOCUMENTS

| CN | 101281683 A | 10/2008 |
| EP | 2743326 A1 | 6/2014 |
| WO | 2016074155 A1 | 5/2016 |

OTHER PUBLICATIONS

ISA State Intellectual Property Office of the People's Republic of China, International Search Report and Written Opinion Issued in Application No. PCT/CN2014/093468, dated Sep. 11, 2015, WIPO, 11 pages.

(Continued)

*Primary Examiner* — Erin F Heard
*Assistant Examiner* — Helena H Seraydaryan
(74) *Attorney, Agent, or Firm* — McCoy Russell LLP (57) ABSTRACT

A lane detection method and a lane detection system mounted on a first vehicle are provided. The methods includes: calculating on which lane a first vehicle is located based on vehicle-to-vehicle data received by the first vehicle from at least one neighboring vehicle, where the neighboring vehicle means another vehicle located within a vehicle-to-vehicle communication range of the first vehicle. The system may include: a communication device for receiving vehicle-to-vehicle data from at least one neighboring vehicle, and a processing device for calculating on which lane the first vehicle is located based on the vehicle-to-vehicle data received by the communication device, where the neighboring vehicle means another vehicle located within a vehicle-to-vehicle communication range of the first vehicle. Lane detection may not rely on marks on roads which are inherently not clear or blur due to a bad weather.

20 Claims, 8 Drawing Sheets

(51) Int. Cl.
*G01S 5/02* (2010.01)
*G01S 19/39* (2010.01)

(58) Field of Classification Search
USPC .................................................. 342/357.34
See application file for complete search history.

(56) References Cited

OTHER PUBLICATIONS

Yanyan, C. et al., "An Improved Hausdorff Distance and Spectral Clustering Vehicle Trajectory Pattern Learning Approach," Computer Application and Software, vol. 29, No. 5, May 2012, 4 pages. (Submitted with English Abstract).
Tang, C. et al., "Incremental modeling and online anomaly detection of vehicle trajectories," Application Research of Computers, vol. 31, No. 7, Jul. 2014, 9 pages. (Submitted with English Abstract).
State Intellectual Property Office of the People's Republic of China, Office Action and Search Report Issued in Application No. 201480083443.X, Nov. 22, 2019, 32 pages. (Submitted with Partial Translation).

* cited by examiner

LANE DETECTION

CROSS REFERENCE TO RELATED APPLICATIONS

The present application is a U.S. National Phase of International Patent Application Serial No. PCT/CN2014/093468, entitled "LANE DETECTION," and filed on Dec. 10, 2014, the entire contents of which are hereby incorporated by reference for all purposes.

TECHNICAL FIELD

The present disclosure generally relates to lane detection.

BACKGROUND

Nowadays, some vehicle-mounted systems can implement lane detection. In some existing solutions, lane information is detected based on image processing technology, which relies on marks on roads. When the marks on the roads are inherently not clear enough or blur due to a bad weather such as fog, lane detection may be affected seriously.

SUMMARY

In one embodiment, a lane detection method is provided. The method includes: calculating on which lane a first vehicle is located based on vehicle-to-vehicle data received by the first vehicle from at least one neighboring vehicle, where the neighboring vehicle means another vehicle located within a vehicle-to-vehicle communication range of the first vehicle.

In some embodiments, the vehicle-to-vehicle data may include dynamic data containing at least one dynamic feature of the at least one neighboring vehicle.

In some embodiments, on which lane the first vehicle is located may be calculated based on trajectories of the first vehicle and the at least one neighboring vehicle, where the trajectory of the at least one neighboring vehicle is calculated based on the dynamic data.

In some embodiments, the dynamic data may include Global Positioning System (GPS) data of the at least one neighboring vehicle, and the trajectory of the at least one neighboring vehicle may be calculated based on the GPS data of the at least one neighboring vehicle.

In some embodiments, the dynamic data may include velocity data and heading data of the at least one neighboring vehicle, and the trajectory of the at least one neighboring vehicle may be calculated based on the velocity data and heading data of the at least one neighboring vehicle, and a relative position of the at least one neighboring vehicle with regard to the first vehicle. In some embodiments, the relative position may be detected by an object detection sensor mounted on the first vehicle.

In some embodiments, on which lane the first vehicle is located may be calculated based on a clustering result obtained by clustering the trajectories of the first vehicle and the at least one neighboring vehicle.

In some embodiments, anomaly, such as a portion of the trajectories corresponding to an abnormal driving state, may be removed from the trajectories of the at least one neighboring device and the first vehicle, and the clustering may be performed based on the trajectories which have been subjected to the anomaly removal process.

In some embodiments, anomaly, such as a portion of the received dynamic data corresponding to an abnormal driving state, may be removed from the received dynamic data, and the trajectory of the at least one neighboring vehicle may be calculated based on the dynamic data which have been subjected to the anomaly removal process.

In some embodiments, the clustering may be performed based on a lane width.

In some embodiments, on which lane the first vehicle is located may be calculated further based on a lane width.

In some embodiments, on which lane the first vehicle is located may be obtained further based on a digital map.

In some embodiments, a total number of lanes on a road where the first vehicle is located may be calculated, and a serial number of the lane on which the first vehicle is located among the calculated total number may be further calculated.

In some embodiments, whether there is a vehicle on an adjacent lane may be calculated.

In one embodiment, a lane detection method is provided. The method includes: calculating information of a first lane on which a first vehicle is located based on vehicle-to-vehicle data received by the first vehicle from at least one neighboring vehicle, where the neighboring vehicle means another vehicle located within a vehicle-to-vehicle communication range of the first vehicle.

In some embodiments, the vehicle-to-vehicle data may include dynamic data containing at least one dynamic feature of the at least one neighboring vehicle.

In some embodiments, the information of the first lane may be calculated based on trajectories of the first vehicle and the at least one neighboring vehicle, where the trajectory of the at least one neighboring vehicle is calculated based on the dynamic data.

In some embodiments, the information of the first lane may be calculated based on a clustering result obtained by clustering the trajectories of the first vehicle and the at least one neighboring vehicle.

In some embodiments, the trajectory of the at least one neighboring vehicle may be calculated based on GPS data of the at least one neighboring vehicle contained in the dynamic data.

In some embodiments, the trajectory of the at least one neighboring vehicle may be calculated based on velocity data and heading data of the at least one neighboring vehicle contained in the dynamic data, and a relative position of the at least one neighboring vehicle with regard to the first vehicle. In some embodiments, the relative position may be detected by an object detection sensor mounted on the first vehicle.

In some embodiments, anomaly, such as a portion of the trajectories corresponding to an abnormal driving state, may be removed from the trajectories of the at least one neighboring device and the first vehicle, and the clustering may be performed based on the trajectories which have been subjected to the anomaly removal process.

In some embodiments, anomaly, such as a portion of the received dynamic data corresponding to an abnormal driving state, may be removed from the received dynamic data, and the trajectory of the at least one neighboring vehicle may be calculated based on the dynamic data which have been subjected to the anomaly removal process.

In some embodiments, the information of the first lane may be calculated further based on a lane width.

In some embodiments, the information of the first lane may be obtained further based on a digital map.

In some embodiments, the information of the first lane may include a serial number of the first vehicle or whether there are adjacent lanes. In some embodiments, the information of the first lane may include whether there are vehicles on the adjacent lanes.

In one embodiment, a lane detection method is provided. The method includes: calculating information of a lane on which a first vehicle is located based on trajectories of the first vehicle and at least one neighboring vehicle, where the neighboring vehicle means another vehicle located within a vehicle-to-vehicle communication range of the first vehicle.

In some embodiments, the trajectory of the at least one neighboring vehicle may be calculated based on vehicle-to-vehicle data received by the first vehicle from the at least one neighboring vehicle.

In one embodiment, a lane detection system mounted on a first vehicle is provided. The lane detection system may include: a communication device for receiving vehicle-to-vehicle data from at least one neighboring vehicle, and a processing device for calculating on which lane the first vehicle is located based on the vehicle-to-vehicle data received by the communication device, where the neighboring vehicle means another vehicle located within a vehicle-to-vehicle communication range of the first vehicle.

In some embodiments, the vehicle-to-vehicle data may include dynamic data containing at least one dynamic feature of the at least one neighboring vehicle.

In some embodiments, the processing device may be configured to: calculate a trajectory of the at least one neighboring vehicle based on the received dynamic data; and obtain on which lane the first vehicle is located based on trajectories of the first vehicle and the at least one neighboring vehicle.

In some embodiments, the dynamic data may include GPS data of the at least one neighboring vehicle, and the processing device may be configured to calculate the trajectory of the at least one neighboring vehicle based on the GPS data of the at least one neighboring vehicle.

In some embodiments, the dynamic data may include velocity data and heading data of the at least one neighboring vehicle, and the processing device may be configured to calculate the trajectory of the at least one neighboring vehicle based on the velocity data and the heading data of the at least one neighboring vehicle, and a relative position of the at least one neighboring vehicle with regard to the first vehicle. In some embodiments, the lane detection system may further include an object detection sensor configured to detect the relative position.

In some embodiments, the processing device may be configured to: perform clustering to the trajectories of the first vehicle and the at least one neighboring vehicle to obtain a clustering result; and obtain on which lane the first vehicle is located based on the clustering result.

In some embodiments, the processing device may be configured to: remove anomaly, such as a portion of the trajectories corresponding to an abnormal driving state, from the trajectories of the at least one neighboring vehicle and the first vehicle; and perform the clustering to the trajectories which have been subjected to the anomaly removal process.

In some embodiments, the processing device may be configured to: remove anomaly, such as a portion of the received dynamic data corresponding to an abnormal driving state, from the received dynamic data; and calculate the trajectory of the at least one neighboring vehicle based on the dynamic data which have been subjected to the anomaly removal process.

In some embodiments, the processing device may be configured to perform the clustering based on a lane width.

In some embodiments, the processing device may be configured to calculate on which lane the first vehicle is located further based on a lane width.

In some embodiments, the processing device may be configured to calculate on which lane the first vehicle is located further based on a digital map.

In some embodiments, the processing device may be configured to calculate a total number of lanes on a road where the first vehicle is located and further calculate a serial number of the lane on which the first vehicle is located among the calculated total number.

In some embodiments, the processing device may be configured to determine whether there is a vehicle on an adjacent lane.

In one embodiment, a lane detection system mounted on a first vehicle is provided. The lane detection system may include: a communication device for receiving vehicle-to-vehicle data from at least one neighboring vehicle, and a processing device for calculating information of a first lane on which the first vehicle is located based on vehicle-to-vehicle data received by the communication device, where the neighboring vehicle means another vehicle located within a vehicle-to-vehicle communication range of the first vehicle.

In some embodiments, the vehicle-to-vehicle data may include dynamic data containing at least one dynamic feature of the at least one neighboring vehicle.

In some embodiments, the processing device may be configured to: calculate a trajectory of the at least one neighboring vehicle based on the received dynamic data; and obtain the information of the first lane based on trajectories of the first vehicle and the at least one neighboring vehicle.

In some embodiments, the processing device may be configured to: perform clustering to the trajectories of the first vehicle and the at least one neighboring vehicle to obtain a clustering result; and obtain the information of the first lane based on the clustering result.

In some embodiments, the processing device may be configured to calculate the trajectory of the at least one neighboring vehicle based on GPS data of the at least one neighboring vehicle contained in the dynamic data.

In some embodiments, the processing device may be configured to calculate the trajectory of the at least one neighboring vehicle based on velocity data and heading data of the at least one neighboring vehicle contained in the dynamic data, and a relative position of the at least one neighboring vehicle with regard to the first vehicle. In some embodiments, the lane detection system may further include an object detection sensor configured to detect the relative position.

In some embodiments, the processing device may be configured to: remove anomaly, such as a portion of the trajectories corresponding to an abnormal driving state, from the trajectories of the at least one neighboring vehicle and the first vehicle; and perform the clustering to the trajectories which have been subjected to the anomaly removal process.

In some embodiments, the processing device may be configured to: remove anomaly, such as a portion of the received dynamic data corresponding to an abnormal driving state, from the received dynamic data; and calculate the trajectory of the at least one neighboring vehicle based on the dynamic data which have been subjected to the anomaly removal process.

In some embodiments, the processing device may be configured to calculate the information of the first lane further based on a lane width.

In some embodiments, the processing device may be configured to calculate the information of the first lane further based on a digital map.

In some embodiments, the information of the first lane may include a serial number of the first vehicle or whether there are adjacent lanes. In some embodiments, the information of the first lane may include whether there are vehicles on the adjacent lanes.

In one embodiment, a lane detection system mounted on a first vehicle is provided. The lane detection system may include: a processing device for calculating information of a lane on which the first vehicle is located based on trajectories of the first vehicle and at least one neighboring vehicle, where the neighboring vehicle means another vehicle located within a vehicle-to-vehicle communication range of the first vehicle.

In some embodiments, the lane detection system may further include a communication device for receiving vehicle-to-vehicle data from the at least one neighboring vehicle, and the processing device may be configured to: calculate the trajectory of the at least one neighboring vehicle based on the vehicle-to-vehicle data received by the communication device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In some safety applications, such as Blind Spot Warning or Lane Change Warning, lane information of a vehicle is important. For example, the lane information may include on which lane the vehicle is located or whether there are vehicles on adjacent lanes.

Figure 1:
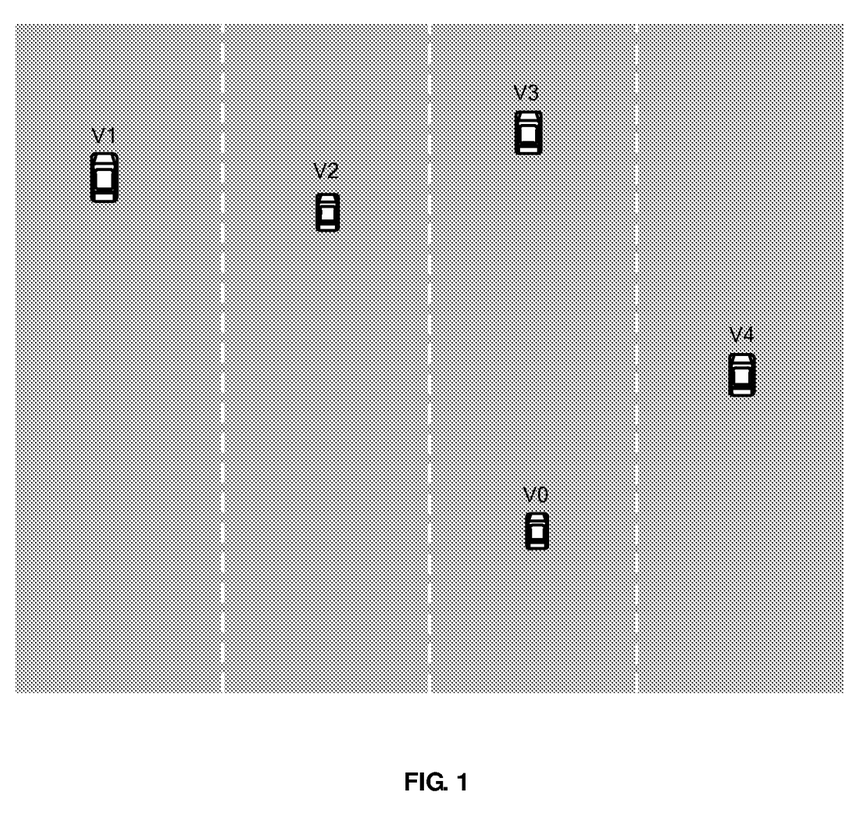
FIG. 1 is a schematic diagram of a driving scenario.

Clustering is a process of grouping a set of objects in such a way that objects in a same group (called a cluster) are more similar (in some sense or another) to each other than to those in other groups (other clusters). FIG. 1 is a schematic diagram of a driving scenario. Referring to FIG. 1, vehicles V0 to V4 are driving on four lanes of a road. The four different lanes may be considered as four clusters, and vehicles on a same lane may be determined to belong to a same cluster. For example, the vehicles V0 and V3 are driving on a same lane, thus, they belong to a same cluster. Further, a trajectory of a vehicle which denotes to a path that the vehicle follows may be used to indicate on which lane the vehicle is located. Therefore, a vehicle may obtain its lane information using a clustering process based on trajectories of itself and neighboring vehicles. It should be noted that, a neighboring vehicle of a vehicle may denote to another vehicle located within a vehicle-to-vehicle communication range of the vehicle.

Figure 2:
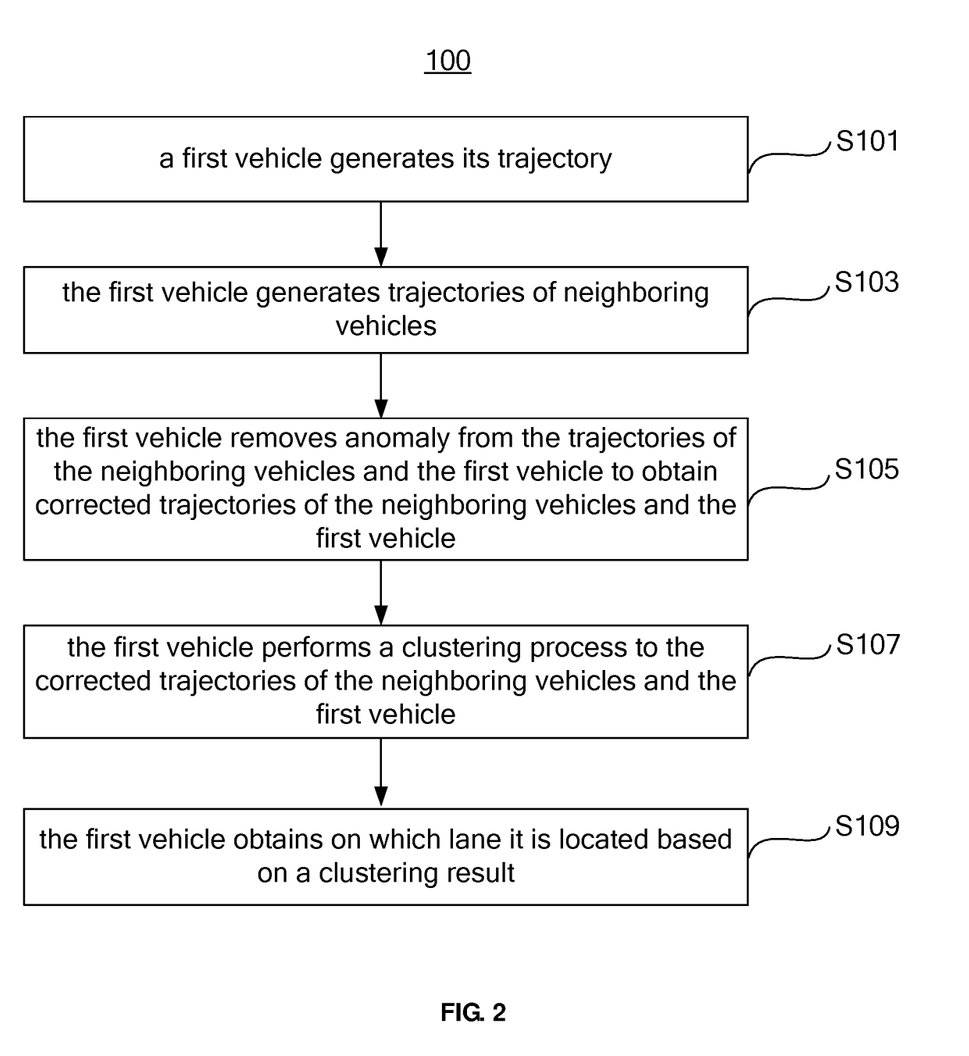
FIG. 2 is a flow chart of a lane detection method 100 according to an embodiment.

FIG. 2 illustrates a flow chart of a lane detection method 100 according to one embodiment.

Referring to FIG. 2, in S101, a first vehicle generates its trajectory.

In some embodiments, the first vehicle may obtain its trajectory based on GPS data of the first vehicle. During travelling, a GPS device may provide the GPS data which include geographical coordinates of the first vehicle and corresponding time points.

In some embodiments, the trajectory of the first vehicle may be generated by performing curve fitting to the GPS data of the first vehicle. The curve fitting technology is well known in the art and is not described in detail here.

In S103, the first vehicle generates trajectories of neighboring vehicles.

In some embodiments, the trajectories of the neighboring vehicles may be generated based on vehicle-to-vehicle data of the neighboring vehicles received from the neighboring vehicles. It should be noted that, the vehicle-to-vehicle data denotes to data wirelessly exchanged among vehicles traveling in the same vicinity. In some embodiments, the vehicle-to-vehicle data may include dynamic data containing at least one dynamic feature of the neighboring vehicles. Inn some embodiments, the dynamic data may include GPS data, velocity data or heading data. In some embodiments, the vehicle-to-vehicle data may be transmitted in vehicle safety messages, such as basic safety messages (BSMs) or cooperative awareness messages (CAMs).

In some embodiments, the first vehicle may generate the trajectories of the neighboring vehicles based on the GPS data of the neighboring vehicles using curve fitting technology, which is similar with S101.

In some embodiments, the first vehicle may generate the trajectories of the neighboring vehicles based on the velocity data and the heading data of the neighboring vehicles, and a relative position of each of the neighboring vehicles with regard to the first vehicle. Detailed information of the trajectory detection can be found in International Application No. PCT/CN2014/090823.

Figure 3:
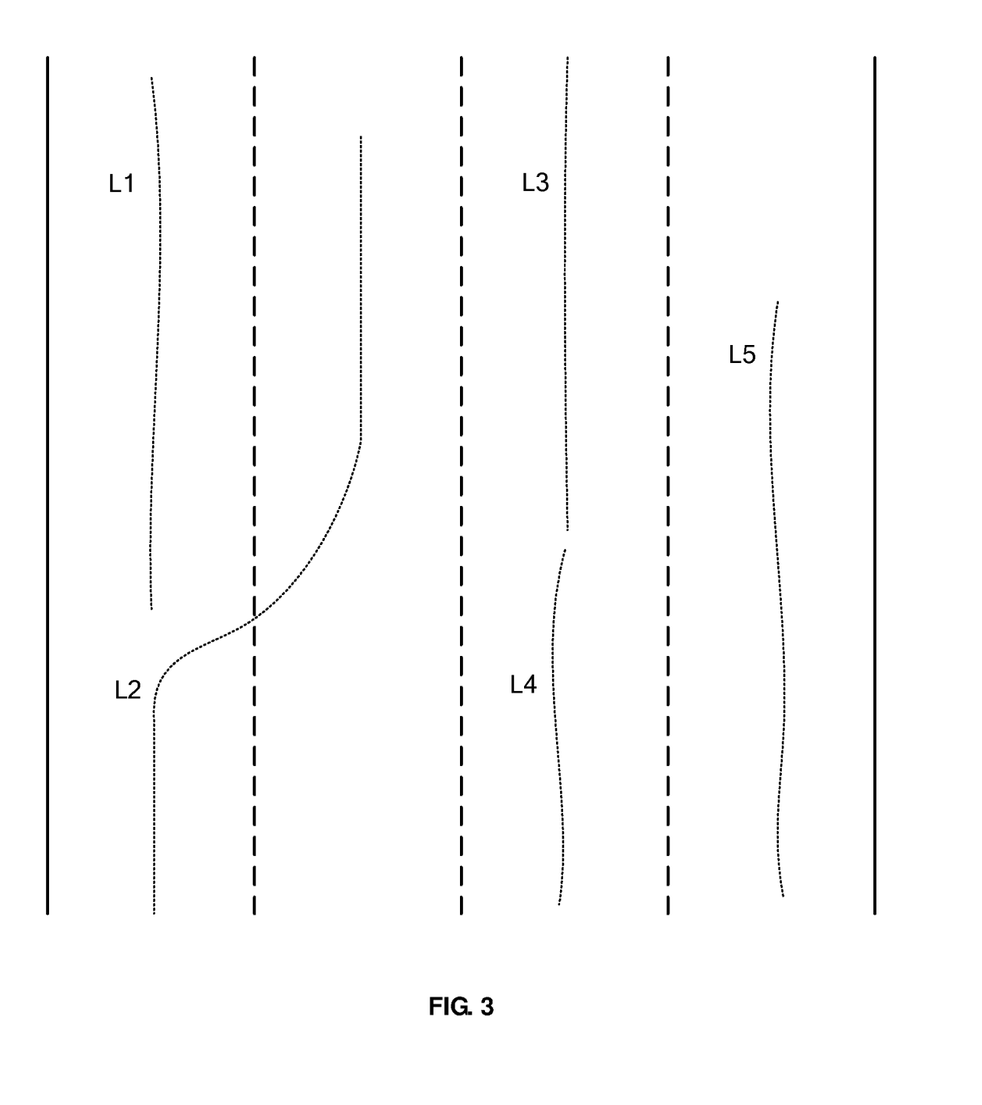
FIG. 3 is a schematic diagram of detected trajectories of vehicles according to an embodiment.

Referring to FIG. 3, FIG. 3 is a schematic diagram of detected trajectories of vehicles according to an embodiment. The first vehicle V0 generates five trajectories L1 to L5 of the five vehicles V0 to V4. The trajectories L1, L2, L3 and L5 are the trajectories of the neighboring vehicles, and the trajectory L4 is the trajectory of the first vehicle V0.

As described above, during a clustering process, vehicles driving on a same lane may belong to one cluster. In practical scenarios, a vehicle may not travel on a same lane on a road all the time. For example, in FIG. 3, the trajectory of the vehicle V2 crosses two lanes. Obviously, a portion L21 of the trajectory is on a first lane and a portion L23 is on a second lane, that is, the portion L21 belongs to one cluster and the portion L23 belongs to another cluster. A portion L22 of the trajectory crossing the two lanes neither belongs to the first lane nor belongs to the second lane, which may not be used in a subsequent clustering process. Generally, an anomaly portion of a trajectory may correspond to an abnormal driving state of a vehicle. Still taking the trajectory L2 of the vehicle V2 for example, the portion L22 indicates the vehicle V2 is changing lanes in a time period corresponding to the portion L22. In some embodiments, to ensure accuracy of clustering results, an anomaly portion of a trajectory like the portion L22 may be removed from the trajectory.

In S105, the first vehicle removes anomaly from the trajectories of the neighboring vehicles and the first vehicle to obtain corrected trajectories of the neighboring vehicles and the first vehicle.

In some embodiments, anomaly in a trajectory of a vehicle may represent a portion of the trajectory of the vehicle which corresponds to an abnormal driving state of the vehicle. In some embodiments, removing the anomaly from the trajectories of the neighboring vehicles may include removing a portion of the trajectories which corresponds to vehicle-to-vehicle data in the abnormal driving state of the neighboring vehicles, that is, the anomaly may be removed based on the vehicle-to-vehicle data.

Figure 4:
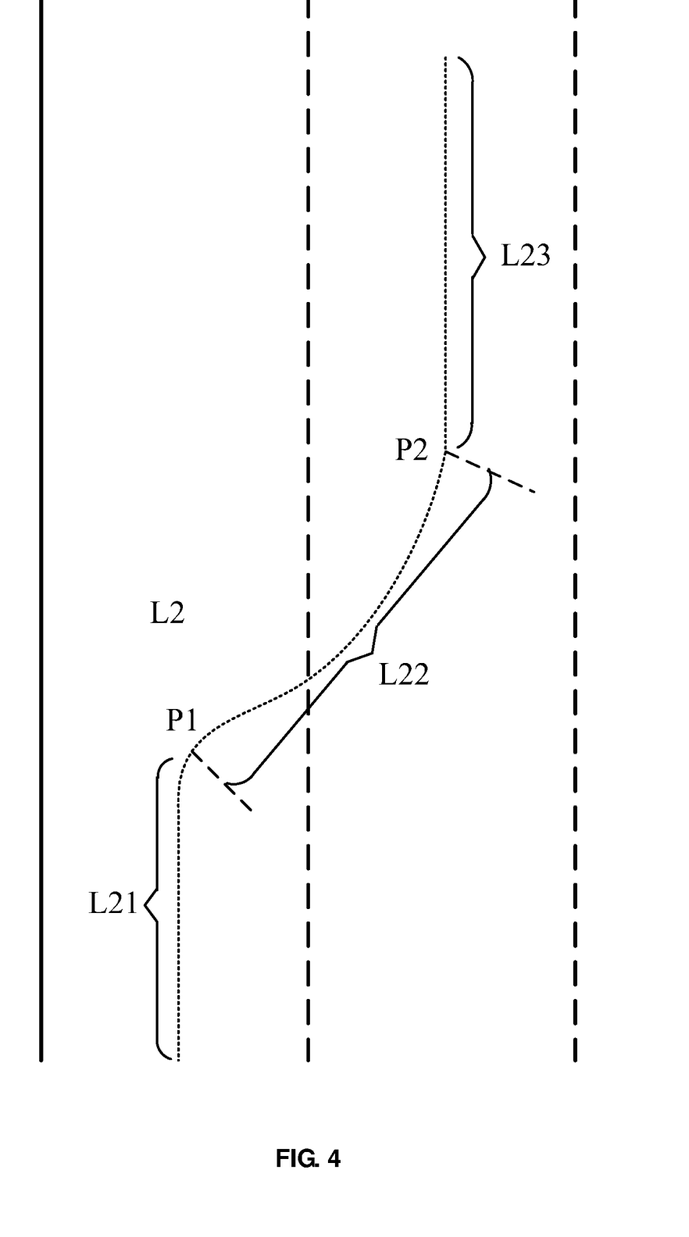
FIG. 4 is an enlarged view of a trajectory L2 shown in FIG. 3.
Figure 5:
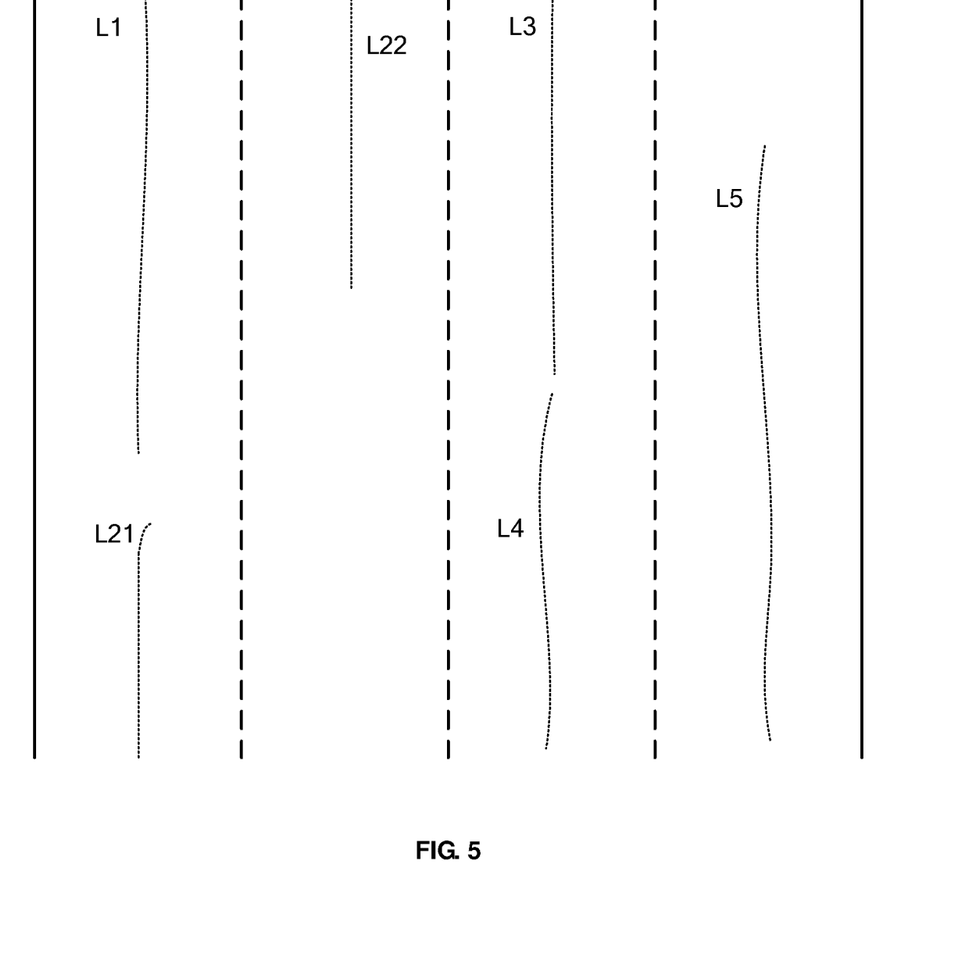
FIG. 5 is a schematic diagram of corrected trajectories of vehicles according to an embodiment.

FIG. 4 is an enlarged view of the trajectory L2 shown in FIG. 3. The portion L22 of the trajectory L2 may be removed to obtain trajectories L1, L21, L22, L3, L4 and L5 to be used in a subsequent clustering process, as shown in FIG. 5. Specifically, the first vehicle V0 may remove the portion L22 of the trajectory L2 based on received vehicle-to-vehicle data of the vehicle V2. Referring to FIG. 4, from a point P1 at the trajectory L22, the vehicle V2 starts to change lanes, and the vehicle V2 finishes changing lanes at a point P2. The first vehicle V0 may determine the portion L22 to be the anomaly based on a lateral acceleration and/or heading information of the vehicle V2 contained in the vehicle-to-vehicle data of the vehicle V2. Besides, the vehicle V2 may turn on a cornering lamp when it changes lanes and turn off the cornering lamp when it finishes changing lanes. Accordingly, the vehicle V2 adds information about turning on the cornering lamp and information about turning off the cornering lamp into messages sent to neighboring vehicles via vehicle-to-vehicle communication. Thus, the first vehicle V0 may determine the portion L22 to be the anomaly further based on the information about turning on/off the cornering lamp from the vehicle V2.

From above, in some embodiments, after the trajectories of the neighboring vehicles and the first vehicle are generated, the anomaly may be removed from the generated trajectories.

Optionally, in some embodiments, anomaly, such as a portion of the received vehicle-to-vehicle data corresponding to an abnormal driving state, may be removed from the received vehicle-to-vehicle data, and the trajectories of the neighboring vehicles may be calculated based on the vehicle-to-vehicle data which have been subjected to the anomaly removal process.

For example, the first vehicle may generate the trajectories of the neighboring vehicles and the first vehicle shown in FIG. 5 directly by excluding data of vehicles during an abnormal driving state before generating the trajectories.

In S107, the first vehicle performs a clustering process to the corrected trajectories of the neighboring vehicles and the first vehicle.

As described above, the clustering process enables similar objects to be in a same cluster.

Considering two vehicles on different lanes of a road have at least one lane width therebetween, the clustering process may rely on the lane width.

Figure 6:
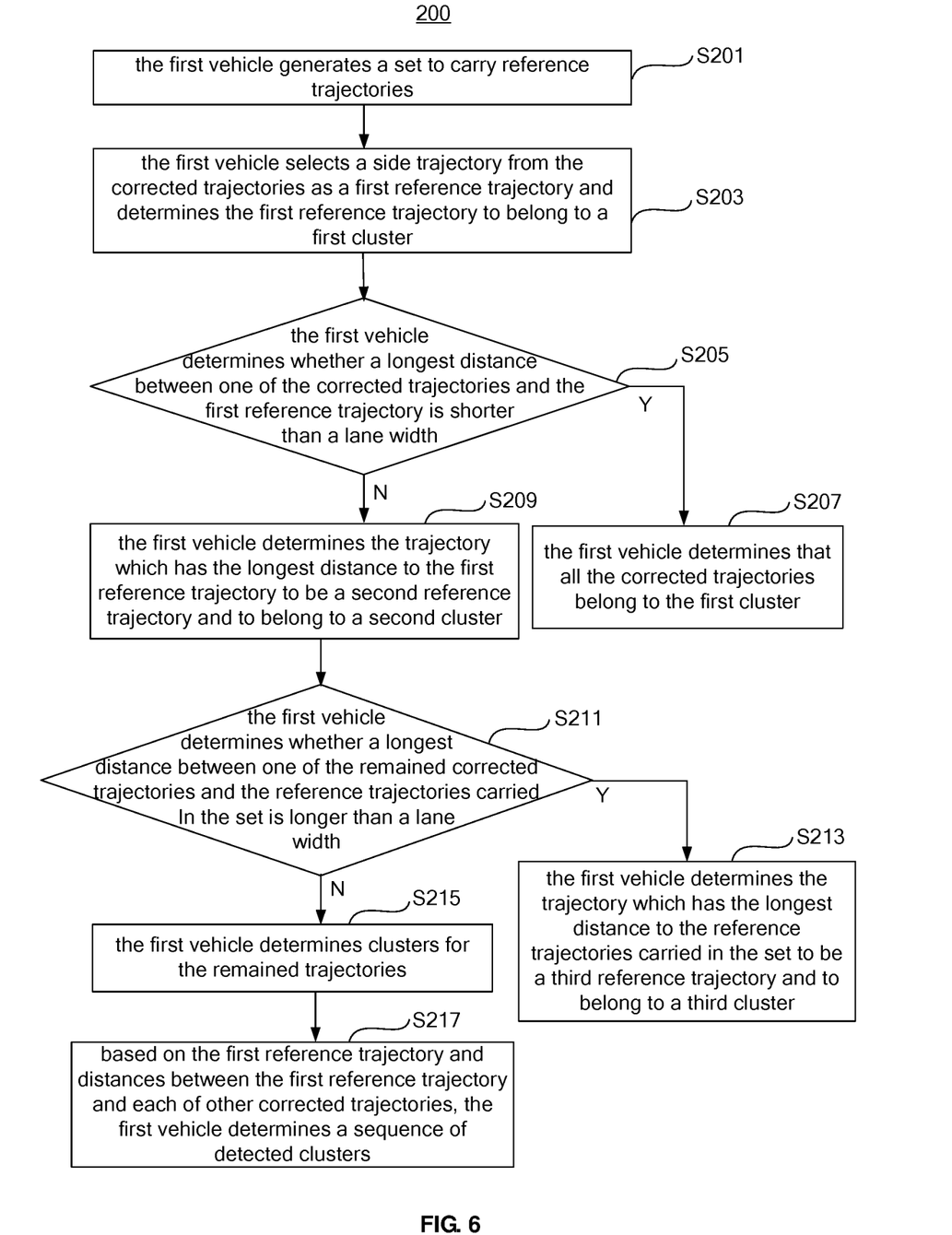
FIG. 6 is a flow chart of a clustering process 200 according to an embodiment.

FIG. 6 is a flow chart of a clustering process 200 according to an embodiment. Hereinafter, the clustering process 200 may be described as an example.

In S201, the first vehicle generates a set to carry reference trajectories.

In S203, the first vehicle selects a side trajectory from the corrected trajectories as a first reference trajectory and determines the first reference trajectory to belong to a first cluster.

In some embodiments, each of the corrected trajectories may be represented by a function like y=T(x) under a same coordinate system. To find a side trajectory among the corrected trajectories, the functions y=T(x) may be converted to another form x=T'(y). In some embodiments, a maximum intercept on a y-axis of curves defined by the functions x=T'(y) may be determined, and the trajectory which corresponds to the maximum intercept may be selected as the side trajectory. In some embodiments, a minimum intercept on the y-axis of the curves defined by the functions x=T'(y) may be determined, and the trajectory which corresponds to the minimum intercept may be selected as the side trajectory.

In some embodiments, the first reference trajectories may be sent to the set carrying reference trajectories.

In S205, the first vehicle determines whether a longest distance between one of the corrected trajectories and the first reference trajectory is shorter than a lane width, if yes, the process goes to S207; else, the process goes to s209.

In some embodiments, a distance between two trajectories means a shortest distance between any two points respectively on the two trajectories.

In some embodiments, the lane width is stipulated to be 3.75 meters in related standards. In some embodiments, the lane width may be obtained from a digital map.

In S207, the first vehicle determines that all the corrected trajectories belong to the first cluster.

In some embodiments, if a distance between any of the corrected trajectories and the reference trajectory is shorter than the lane width, all the corrected trajectories may belong to one cluster, that is, the neighboring vehicles and the first vehicle may be travelling on a same lane of a road.

In S209, the first vehicle determines the trajectory which has the longest distance to the first reference trajectory to be a second reference trajectory and to belong to a second cluster.

In some embodiments, the second reference trajectory may be sent to the set carrying reference trajectories.

In S211, the first vehicle determines whether a longest distance between one of the remained corrected trajectories and the reference trajectories carried in the set is longer than a lane width, if yes, the process goes to S213; else, the process goes to S215.

In some embodiments, a distance between a trajectory and the reference trajectories may denote to a sum of distances between the trajectory and each of the reference trajectories.

In S213, the first vehicle determines the trajectory which has the longest distance to the reference trajectories carried in the set to be a third reference trajectory and to belong to a third cluster, and repeats step S211.

In S215, the first vehicle determines clusters for the remained trajectories.

In some embodiments, a remained trajectory may be determined to belong to one of the detected clusters if a distance between the remained trajectory and a clustered trajectory belonging to the one of the detected clusters is shorter than the lane width. In this manner, all the corrected trajectories are clustered to the detected trajectories.

In some embodiments, the number of detected clusters may actually be the number of lanes. In some embodiments, the number of detected clusters may be not equal to an actual number of lanes, because, for example, one lane may not have any vehicles travelling thereon.

In S217, based on the first reference trajectory and distances between the first reference trajectory and each of other corrected trajectories, the first vehicle determines a sequence of detected clusters.

In some embodiments, a sequence of the detected clusters may include a distribution of the detected clusters along a direction perpendicular to a heading direction of the first vehicle.

In S109, the first vehicle obtains on which lane it is located based on a clustering result.

Based on the above clustering process, the first vehicle obtains the number of clusters of the corrected trajectories and a serial number of its trajectory. In some embodiments, the clusters may correspond to lanes. Thus, the first vehicle may obtain on which lane it is located based on the serial number of its trajectory.

Figure 7:
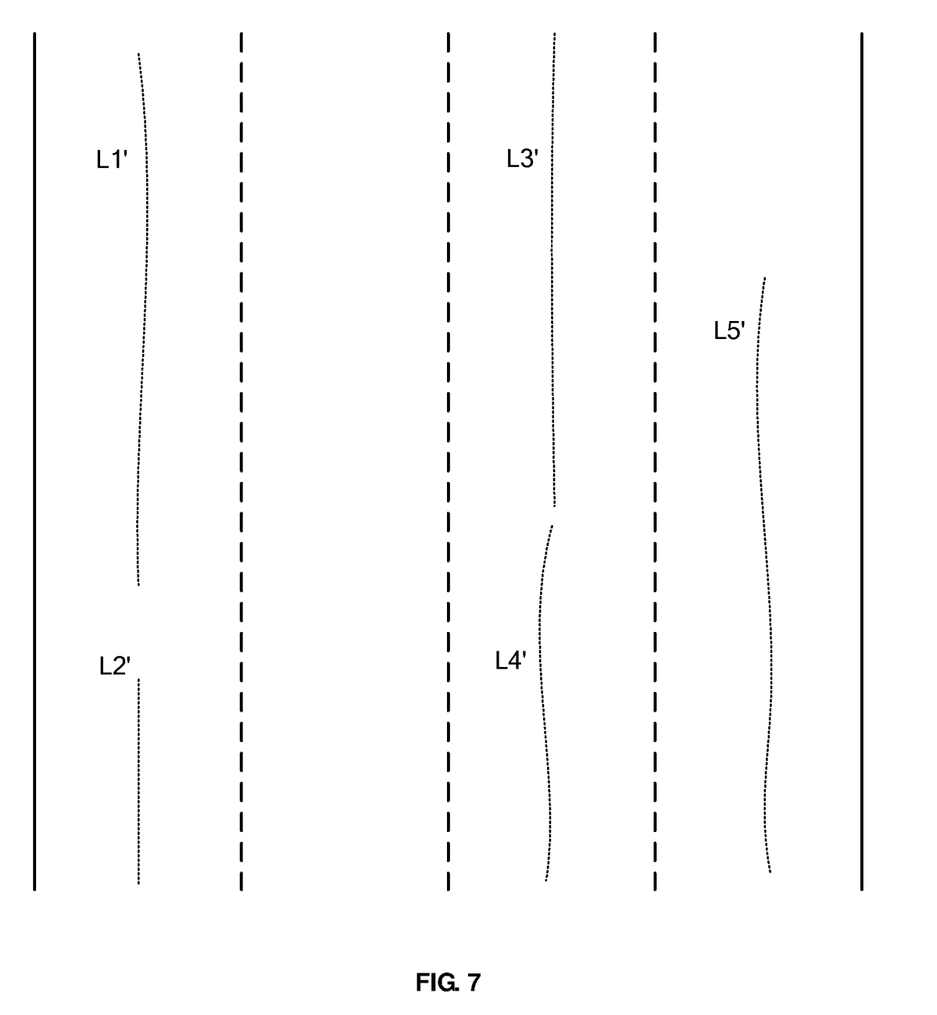
FIG. 7 is a schematic diagram of trajectories of vehicles according to an embodiment.

In some embodiments, the number of clusters may be smaller than the number of lanes. For example, referring to FIG. 7, five trajectories L1' to L5' are generated along a north direction, and the trajectory L4' is the trajectory of the first vehicle. After a clustering process, three clusters 1, 2 and 3 may be formed from west to east and the first vehicle may be determined to travel on a second lane from west to east. However, actually, the first vehicle is travelling on a third lane from west to east. The incorrect determination is because that no vehicle is travelling on the second lane. Thus, following steps may be necessary in some embodiments. Assuming that the trajectory L4' of the first vehicle belongs to the cluster 2, and adjacent two clusters are clusters 1 and 3, a distance between the trajectory L4' and a trajectory L1' in the cluster 1 and a distance between the trajectory L4' and a trajectory L5' in the cluster 3 may be calculated. The first vehicle may find that the distance between the trajectories L4' and L1' is more than one lane width, which indicates that the adjacent cluster 1 on a west side does not correspond to a lane adjacent to the lane on which the first vehicle is travelling actually. Thus, the first vehicle may determine that there is no vehicle travelling on an adjacent lane on a west side nearby.

In some embodiments, on which lane the first vehicle is located may be obtained further based on a digital map. For example, if it is determined that the first vehicle belongs to a second cluster from west to east and the number of the clusters is four, and the number of lanes presented on the digital map is also four, the first vehicle may determine that it is located on the second lane from west to east.

To better understanding the clustering process 200, a detailed example is described combining with FIG. 5.

Referring to FIG. 5, the first vehicle V0 may select the most east trajectory L5 as a reference trajectory and determines the trajectory L5 to belong to a cluster 1. Afterwards, the first vehicle V0 calculates a distance between the trajectory L5 and each of the trajectories L1, L21, L22, L3 and L4, and determines the trajectory L1 to be farthest from the trajectory L5 and to belong to a cluster 2. Afterwards, the first vehicle V0 finds a trajectory farthest to the clustered trajectories L1 and L5, that is, the sum of a distance between the trajectory to be found and the trajectory L1 and a distance between the trajectory to be found and the trajectory L5 should reach the maximum value. For example, the first vehicle V0 determines the trajectory L22 to be the trajectory farthest to the clustered trajectories L1 and L5. Further, both a distance between the trajectories L22 and L1 and a distance between the trajectories L22 and L5 are greater than a lane width, thus, the first vehicle V0 determines the trajectory L22 to belong to a cluster 3. So far, the clustered trajectories include L1, L22 and L5. Similarly, the first vehicle V0 may determine the trajectory L3 to be the trajectory farthest to the clustered trajectories L1, L22 and L5. As a distance between the trajectory L3 and any one of the trajectories L1, L22 and L5 is longer than the lane width, the trajectory L3 is determined to belong to a cluster 4. Afterwards, among the remained trajectories L21 and L4, neither the trajectory L21 nor the trajectory L4 has distances greater than the lane width to each of the clustered trajectories L1, L22, L3 and L5, thus, no new cluster may be formed. By comparing distances between the trajectory L21 and each of the clustered trajectories L1, L22, L3 and L5 with the lane width, the first vehicle V0 finds the trajectory L21 has a distance shorter than the lane width to the trajectory L1, and thus determines the trajectory L21 to belong to the cluster 2. Similarly, the trajectory L4 is determined to belong to the cluster 4. In this manner, the clustering process is performed. Four clusters are obtained and the trajectories L1, L21, L22, L3, L4 and L5 are classified to the four clusters. Based on the reference trajectory L5 and distances between the reference trajectory L5 and each of the trajectories L1, L21, L22, L3 and L4, the first vehicle V0 may find that the four clusters from east to west are clusters 1, 4, 3 and 2, respectively. As the trajectory L4 of the first vehicle V0 belongs to the cluster 4, the first vehicle V0 determines that it is located on the second lane from east to west.

From above, based on trajectories of a host vehicle and its neighboring vehicles, a clustering process may be performed to the trajectories to obtain a clustering result. And the host vehicle may obtain on which lane it is located or whether there are vehicles on adjacent lanes according to the clustering result.

Figure 8:
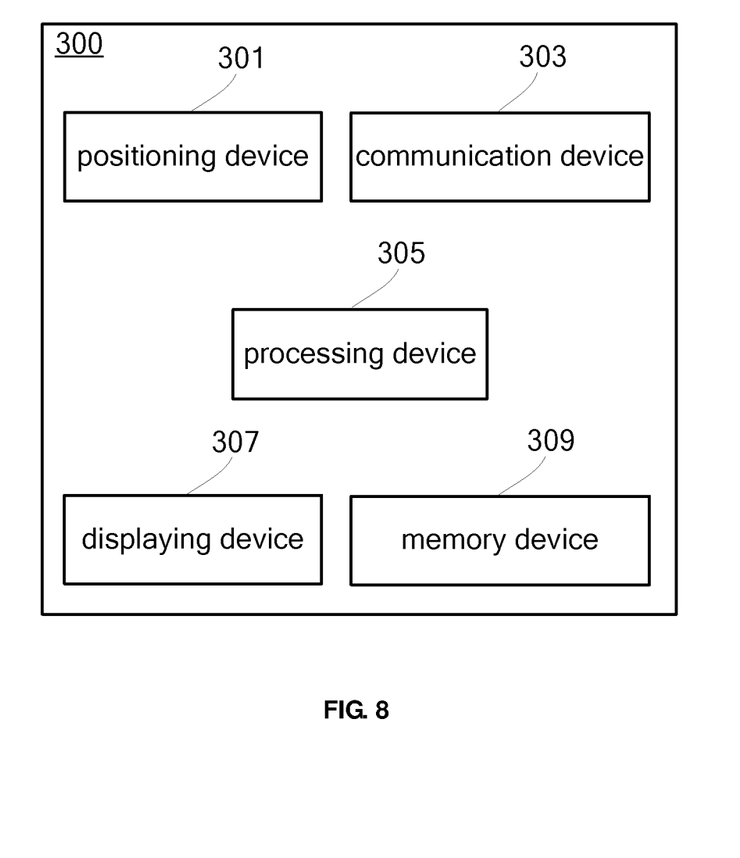
FIG. 8 is a schematic block diagram of a lane detection system 300 mounted on a first vehicle according to an embodiment.

FIG. 8 illustrates a schematic block diagram of a lane detection system 300 mounted on a first vehicle according to one embodiment. Referring to FIG. 8, the lane detection system 300 includes a positioning device 301, a communication device 303, a processing device 305, a displaying device 307 and a memory device 309.

In some embodiments, the positioning device may be configured to obtain GPS data of the first vehicle. In some embodiments, the communication device 303 may be configured to receive vehicle-to-vehicle data from neighboring vehicles. In some embodiments, the processing device 305 may be configured to calculate on which lane the first vehicle is located based on the vehicle-to-vehicle data received by the communication device 303. In some embodiments, the displaying device 307 may be configured to present the lane information to a user.

In some embodiments, the processing device 305 may be further configured to: calculate trajectories of the neighboring vehicles based on the vehicle-to-vehicle data of the neighboring vehicles; generate a trajectory of the first vehicle based on the GPS data of the first vehicle; perform clustering to the trajectories of the neighboring vehicles and the first vehicle to obtain a clustering result; and obtain on which lane the first vehicle is located based on the clustering result.

In some embodiments, the vehicle-to-vehicle data may be transmitted in vehicle safety messages, such as BSMs or CAMs. In some embodiments, the vehicle-to-vehicle data may include dynamic data containing at least one dynamic feature of the neighboring vehicles.

In some embodiments, the dynamic data may include GPS data of the neighboring vehicles. In some embodiments, the processing device 305 may be configured to generate the trajectories of the neighboring vehicles based on the GPS data of the neighboring vehicles.

In some embodiments, the dynamic data may include velocity data and heading data of the neighboring vehicles. In some embodiments, the lane detection system 300 may further include an object detection sensor for detecting a relative position of each of the neighboring vehicles with regard to the first vehicle. In some embodiments, the processing device 305 may be configured to generate the trajectories of the neighboring vehicles based on the velocity data and the heading data of the neighboring vehicles, and the relative position of each of the neighboring vehicles with regard to the first vehicle.

In some embodiments, the processing device 305 may be further configured to: remove anomaly, such as a portion of the trajectories corresponding to an abnormal driving state, from the trajectories of the neighboring vehicles; and perform the clustering to the trajectories which have been subjected to the anomaly removal process.

In some embodiments, the processing device 305 may be configured to: remove anomaly, such as a portion of the received dynamic data corresponding to an abnormal driving state, from the received dynamic data; and calculate the trajectories of the neighboring vehicles based on the dynamic data which have been subjected to the anomaly removal process.

In some embodiments, the processing device 305 may be configured to perform the clustering based on a lane width. In some embodiments, the processing device 305 may be configured to calculate on which lane the first vehicle is located further based on the lane width. In some embodiments, the processing device 305 may be configured to obtain on which lane the first vehicle is located further based on a digital map.

In some embodiments, the processing device 305 may be configured to calculate a total number of lanes on a road where the first vehicle is located and further calculate a serial number of the lane on which the first vehicle is located among the calculated total number.

In some embodiments, the processing device 305 may be configured to determine whether there is a vehicle on an adjacent lane.

In some embodiments, the processing device 305 may be a CPU, or a MCU, or a DSP etc., or any combination thereof. The memory device 309 may store an operating system and program instructions.

According to one embodiment, a non-transitory computer readable medium, which contains a computer program for lane detection, is provided. When the computer program is executed by a processor, it will instruct the processor to: calculate on which lane a first vehicle is located based on vehicle-to-vehicle data received by the first vehicle from at least one neighboring vehicle, where the neighboring vehicle means another vehicle located within a vehicle-to-vehicle communication range of the first vehicle.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A lane detection method, comprising:
   generating, by a first vehicle, its own trajectory comprising a first vehicle trajectory;
   generating, by the first vehicle, a trajectory of at least one neighboring vehicle comprising at least one neighboring vehicle trajectory, wherein the at least one neighboring vehicle trajectory is based upon vehicle-to-vehicle data received by the first vehicle from the at least one neighboring vehicle, where the at least one neighboring vehicle is located within a vehicle-to-vehicle communication range of the first vehicle;
   removing, by the first vehicle, a first vehicle trajectory anomaly from the first vehicle trajectory to obtain a corrected first vehicle trajectory, where the first vehicle trajectory anomaly corresponds to a first vehicle abnormal driving state;
   removing, by the first vehicle, a neighboring vehicle trajectory anomaly from the at least one neighboring vehicle trajectory to obtain at least one corrected neighboring vehicle trajectory, where the neighboring vehicle trajectory anomaly corresponds to a neighboring vehicle abnormal driving state; and
   calculating on which lane the first vehicle is located based on the vehicle-to-vehicle data received by the first vehicle from the at least one neighboring vehicle and based on the corrected first vehicle trajectory and the at least one corrected neighboring vehicle trajectory.

2. The lane detection method according to claim 1, wherein the vehicle-to-vehicle data comprises dynamic data containing at least one dynamic feature of the at least one neighboring vehicle.

3. The lane detection method according to claim 2, wherein on which lane the first vehicle is located is calculated based on the trajectories of the first vehicle and the at least one neighboring vehicle, and wherein the trajectory of the at least one neighboring vehicle is calculated based on the dynamic data.

4. The lane detection method according to claim 3, wherein the dynamic data comprises Global Positioning System (GPS) data of the at least one neighboring vehicle, and wherein the trajectory of the at least one neighboring vehicle is calculated based on the GPS data of the at least one neighboring vehicle.

5. The lane detection method according to claim 3, wherein the dynamic data comprises velocity data and heading data of the at least one neighboring vehicle, and wherein the trajectory of the at least one neighboring vehicle is calculated based on the velocity data and the heading data of the at least one neighboring vehicle, and a relative position of the at least one neighboring vehicle with regard to the first vehicle.

6. The lane detection method according to claim 3, wherein on which lane the first vehicle is located is calculated based on a clustering result obtained by clustering the trajectories of the first vehicle and the at least one neighboring vehicle.

7. The lane detection method according to claim 6, wherein the anomaly is removed from the trajectories of the at least one neighboring vehicle and the first vehicle, and wherein the clustering is performed based on the corrected first vehicle trajectory and the at least one corrected neighboring vehicle trajectory.

8. The lane detection method according to claim 3, wherein an anomaly is removed from the received dynamic data, and wherein the trajectory of the at least one neighboring vehicle is calculated based on the dynamic data with the anomaly removed.

9. The lane detection method according to claim 6, wherein the clustering is performed based on a lane width.

10. The lane detection method according to claim 1, wherein a total number of lanes on a road where the first vehicle is located is calculated, and wherein a serial number of the lane, on which the first vehicle is located, among the calculated total number of lanes is further calculated.

11. A lane detection system mounted on a first vehicle, the system comprising a communication device for receiving vehicle-to-vehicle data from at least one neighboring vehicle, and a processing device configured to perform a method comprising:
generating, by the first vehicle, its own trajectory comprising a first vehicle trajectory;
generating, by the first vehicle, a trajectory of at least one neighboring vehicle comprising at least one neighboring vehicle trajectory, wherein the at least one neighboring vehicle trajectory is based upon the vehicle-to-vehicle data received by the first vehicle from the at least one neighboring vehicle, where the at least one neighboring vehicle is located within a vehicle-to-vehicle communication range of the first vehicle;
removing, by the first vehicle, a first vehicle trajectory anomaly from the first vehicle trajectory to obtain a corrected first vehicle trajectory, where the first vehicle trajectory anomaly corresponds to a first vehicle abnormal driving state;
removing, by the first vehicle, a neighboring vehicle trajectory anomaly from the at least one neighboring vehicle trajectory to obtain at least one corrected neighboring vehicle trajectory, where the neighboring vehicle trajectory anomaly corresponds to a neighboring vehicle abnormal driving state; and
calculating on which lane the first vehicle is located based on the vehicle-to-vehicle data received by the first vehicle from the at least one neighboring vehicle and based on the corrected first vehicle trajectory and the at least one corrected neighboring vehicle trajectory.

12. The lane detection system according to claim 11, wherein the vehicle-to-vehicle data comprises dynamic data containing at least one dynamic feature of the at least one neighboring vehicle.

13. The lane detection system according to claim 12, wherein the processing device is configured to:
calculate the trajectory of the at least one neighboring vehicle based on the received dynamic data; and
obtain on which lane the first vehicle is located based on the trajectories of the first vehicle and the at least one neighboring vehicle.

14. The lane detection system according to claim 13, wherein the dynamic data comprises GPS data of the at least one neighboring vehicle, and wherein the processing device is configured to calculate the trajectory of the at least one neighboring vehicle based on the GPS data of the at least one neighboring vehicle.

15. The lane detection system according to claim 13, wherein the dynamic data comprises velocity data and heading data of the at least one neighboring vehicle, and wherein the processing device is configured to calculate the trajectory of the at least one neighboring vehicle based on the velocity data and the heading data of the at least one neighboring vehicle, and a relative position of the at least one neighboring vehicle with regard to the first vehicle.

16. The lane detection system according to claim 13, wherein the processing device is configured to:
perform clustering to the trajectories of the first vehicle and the at least one neighboring vehicle to obtain a clustering result; and
obtain on which lane the first vehicle is located based on the clustering result.

17. The lane detection system according to claim 16, wherein the processing device is configured to:
remove the anomaly from the trajectories of the at least one neighboring vehicle and the first vehicle; and
perform the clustering to the trajectories based on the corrected first vehicle trajectory and the at least one corrected neighboring vehicle trajectory.

18. The lane detection system according to claim 13, wherein the processing device is configured to:
remove an anomaly from the received dynamic data; and
calculate the trajectory of the at least one neighboring vehicle based on the dynamic data with the anomaly removed.

19. The lane detection system according to claim 16, wherein the processing device is configured to perform the clustering based on a lane width.

20. The lane detection system according to claim 11, wherein the processing device is configured to:
calculate a total number of lanes on a road where the first vehicle is located; and
further calculate a serial number of the lane on which the first vehicle is located among the calculated total number of lanes.

* * * * *